United States Patent
Albrektson

(10) Patent No.: US 6,712,616 B2
(45) Date of Patent: Mar. 30, 2004

(54) SYSTEM FOR EDUCATION ABOUT NAMES

(75) Inventor: Björn Albrektson, Lidingö (SE)

(73) Assignee: Vision & Waves AB, Lidingo (SE)

(*) Notice: Subject to any disclaimer, the term of this patent is extended or adjusted under 35 U.S.C. 154(b) by 0 days.

(21) Appl. No.: 09/840,626

(22) Filed: Apr. 23, 2001

(65) Prior Publication Data

US 2002/0155418 A1 Oct. 24, 2002

(51) Int. Cl.[7] ............................................. G09B 19/12
(52) U.S. Cl. ...................... 434/304; 434/350; 434/154; 725/22; 725/32; 725/109
(58) Field of Search ........................... 434/304, 307 R, 434/322, 323, 350; 725/22, 23, 32, 109; 455/414.1, 414.2, 414.3

(56) References Cited

U.S. PATENT DOCUMENTS

| | | | | |
|---|---|---|---|---|
| 5,671,411 A | * | 9/1997 | Watts et al. | 348/906 |
| 5,713,795 A | * | 2/1998 | Kohorn | 463/17 |
| 6,055,513 A | * | 4/2000 | Katz et al. | 705/10 |
| 6,108,640 A | * | 8/2000 | Slotznick | 704/9 |
| 6,163,316 A | * | 12/2000 | Killian | 345/708 |
| 6,268,849 B1 | * | 7/2001 | Boyer et al. | 345/721 |

OTHER PUBLICATIONS

Terry H. Jones, 1997–2003, Catholic Calendar of Saints, Catholic Community Forum, pp. 1–8.*

* cited by examiner

Primary Examiner—S. Thomas Hughes
Assistant Examiner—John L. Sotomayor
(74) Attorney, Agent, or Firm—Ware, Fressola, Van der Sluys & Adolphson LLP

(57) ABSTRACT

The invention relates to a system (20) and a method and signal used for broadcasting of a media package (28). In the media package, a name list is established for a predetermined period of days or on a day by day basis and includes one name for every day of the period. The list could be established by a software program providing names from a name database. A media channel is used for broadcasting a name of the day media package (28) comprising at least a presentation of the at least name corresponding to the day of a broadcast (40). The media channel presents the media package (28) on a display (24), whereby an audience is educated about each presented name and its history.

31 Claims, 2 Drawing Sheets

| | | |
|---|---|---|
| 12 MONDAY | NAME DAY OF THE CROWN PRINCESS<br><br>VICTORIA | <u>10</u> |
| 13 TUESDAY | GREGER | |
| 14 WEDNESDAY | MATILDA, MAUD | |
| 15 THURSDAY | KRISTOFFER, CHRISTEL | |
| 16 FRIDAY | HERBERT, GILBERT | |
| 17 SATURDAY | GERTRUD | |
| 18 SUNDAY | EDVARD, EDMUND | |

Fig. 1

(PRIOR ART)

SYSTEM FOR EDUCATION ABOUT NAMES

TECHNICAL FIELD

The present invention pertains to a system for presenting a name of the day and a method and signal therefore.

BACKGROUND ART

Most European countries present a given name of the day in their official almanacs. Mostly one name a day is presented, but there are also presentations of variants of a given name such as, for example, Marcus, Mark, and Marc could be presented on the same day. The name of the day is a joyful event mostly to the children, which are congratulated by their parents and other relatives on the very same day and often given a small gift.

When members of a Royal Family have their "name-day" it is an official flag-flying day in Sweden.

More generally a name-day is a Christian custom created with the purpose of undermining the heathen ancient birthday celebrations. Hence, a name list was created with its foundation on the day of the death of a saint, which day was given the name of the saint in question.

Nowadays more common names are listed in a name-day list, where the names are not necessarily connected to the names of saints.

In order to spread the tradition of name-days and to educate people of the origin of their name, which famous people that bear the name etc., a need for a media system, more than an almanac, that can convey the tradition would be appreciated by many. Such a system would lead to a better step by step knowledge of our today and ancient history.

The particulars of the present invention are set out in the attached independent claims, and further embodiments are set out in the attached dependent sub-claims.

SUMMARY OF THE DESCRIBED INVENTION

The present invention relates to educating individuals about our today and ancient history through the name-day concept. In order to fulfill the aims and goals of the present invention it sets forth a system for presenting a name of the day. It thereby comprises:

establishing means for a name list of a predetermined period of days or on a day by day basis including at least one name for every day of said period;

a media channel means for broadcasting a name of the day package comprising at least a presentation of said name(s) corresponding to the day of a broadcast;

presenting means for said package on a display means, whereby an audience is provided a tangible education about a presented name in said package.

In one embodiment every day comprises at least one female name of the day and/or one male name of the day.

Another embodiment comprises that the media channel is a television channel.

A further embodiment comprises that the display means is a newspaper, journal or the like.

A still further embodiment comprises that the media channel is a network for data- and telecommunication.

Yet another embodiment comprises that a presentation of a celebrity bearer of a presented name is introduced through the media package.

A yet still further embodiment comprises that ordinary people greet a bearer of a presented name through means connected to the media channel. In a further embodiment ordinary people are able to enter a recording booth placed on a public place, whereby they can record and transfer a greeting to a person bearing a presented name through said media channel.

In one other embodiment the name of the day is chosen by random from a database with given names.

Further the present invention sets forth a method for presenting a name of the day, whereby it comprises the steps of:

establishing a name list for a predetermined period of days or on a day by day basis including at least one name for every day of said period;

using a media channel for broadcasting a name of the day package comprising at least a presentation of said name(s) corresponding to the day of a broadcast;

presenting said package on display means and educating an audience about a presented name in said package.

The method of the present invention is also able to provide steps of the embodiments in accordance with the described system.

Still further the present invention sets forth a signal carrying a media package for presenting a name of the day, comprising:

a media channel signal means for broadcasting a name of the day media package signal comprising at least a presentation of said name(s) corresponding to the day of a broadcast; and the signal controlling a presentation means for said package on a display means, whereby an audience is educated about a presented name and its history in said package.

BRIEF DESCRIPTION OF THE DRAWINGS

Henceforth reference is had to the attached figures throughout the description for a better understanding of the examples and embodiments of the present invention, whereby:

FIG. 1 is schematically illustrating a prior art calendar page, displaying names of the day for week No. 11 year 2001 according to the Swedish name list.

DETAILED DESCRIPTION OF PREFERRED EMBODIMENTS

Figure 2:
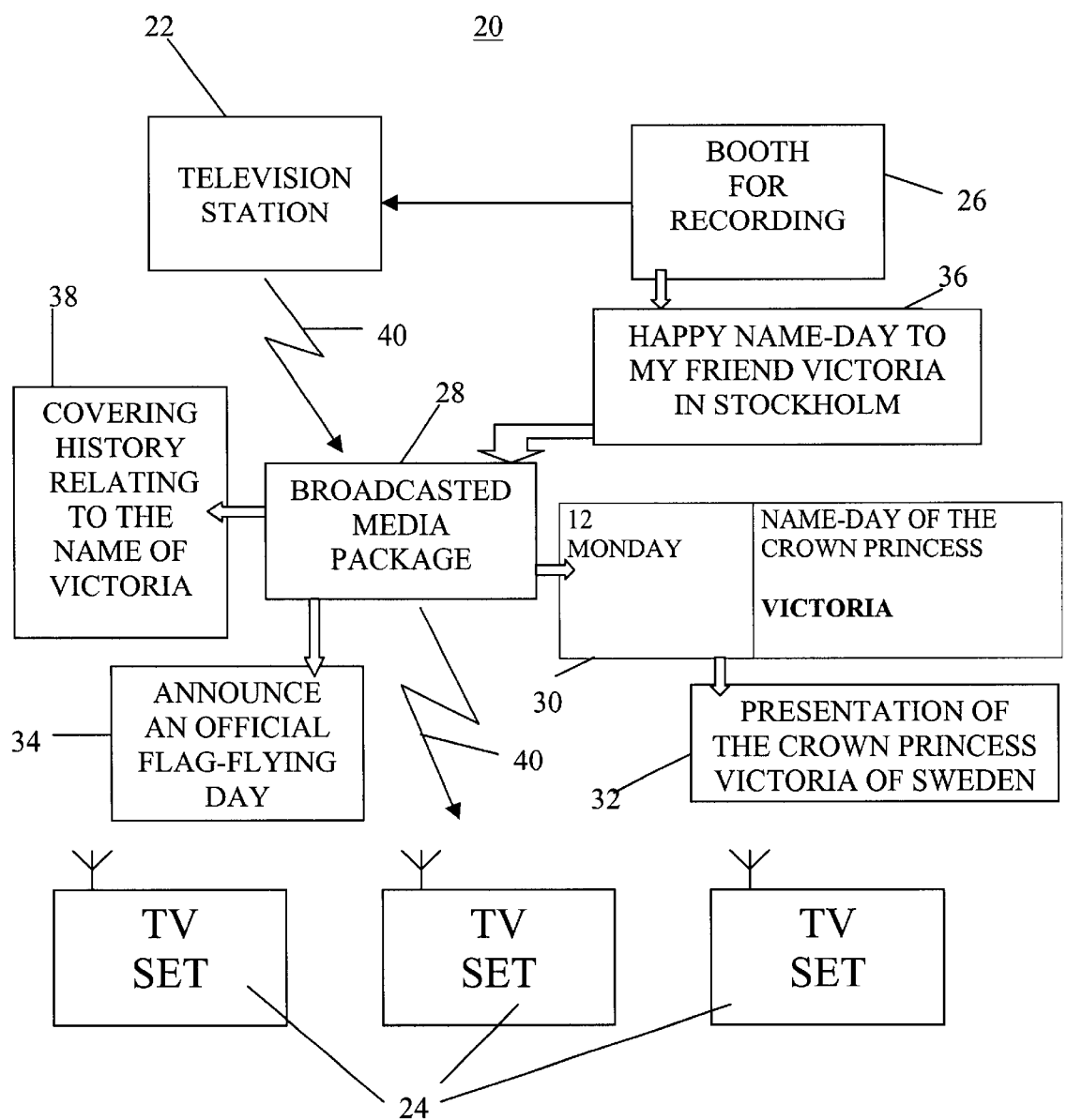
FIG. 2 schematically illustrates a broadcasting system in accordance with the present invention.

The present invention relates to education of individuals about our today and ancient history through the name-day concept. As mentioned, more generally a name-day is a Christian custom created with the purpose of undermining the heathen ancient birthday celebrations. Hence, a name list was created with its foundation on the day of the death of a saint, which day was given the name of the saint in question.

Nowadays more common names among a population of people are listed in a name list, where the names are not necessarily connected to the names of saints.

In order to spread the tradition of name-days and to educate people of the origin of their name, which famous people that bear the name etc., a need for a media system, more than an almanac, that can convey the tradition would be appreciated by many. Such a system would lead to a better step by step knowledge of our current and ancient history.

FIG. 1 is schematically illustrating a prior art calendar page 10, displaying names of the day for week No. 11 year 2001 according to the Swedish name list. Some days have only one name related to them, such as Monday 12, Tuesday 13, and Saturday 17, and other days have two names assigned, which often are closely related to each other. In week No. 11 of the Swedish calendar in accordance with FIG. 1, two names are assigned to Wednesday, Thursday, Friday, and Sunday. Only Thursday, for week No. 11, has two names assigned that immediately could be regarded as closely related, namely Kristoffer and Christel. Christel is a female given name.

The calendar of week No. 11 also comprises at least one day with a given name of a saint. Saturday is assigned Gertrud, named after St Gertrud. Week 11 is interesting in a lot of aspects and provides a given name for the Crown Princess Victoria of Sweden on Monday 12. This day is an official flag-flying day in Sweden. As many royalties are bearer of the name Victoria, it can be assumed that this day also can be an official flag-flying day in other Kingdoms.

FIG. 2 schematically illustrates a broadcasting system 20 in accordance with the present invention. It is assumed in this description as an example that the day for a broadcasting of a name-day package 28 is Mar. 12, 2001, a Monday, the name-day of Victoria. In a broad term, the embodiment of the broadcasting system 20 in accordance with FIG. 2 consists of a television station 22 for broadcasting of TV-programs, a room, booth 26 or the like where the public can record greetings to friends and relatives on their name-day. A broadcasting of TV programs is of course received by television sets 24, or the like apparatus for reception of a video signal or digital signal broadcast. It is appreciated that the embodiment of FIG. 2 is one possible out of many. Examples of other systems 20 are, radio, open networks such as Internet, Newspaper publisher etc. The receivers 24 are then, for example, radio receivers, PC computers, and desktop computers, respectively.

As schematically depicted in FIG. 2 one embodiment of the invention comprises a media package 28, broadcasted to a public. The media package comprises a number of information/education to the public about the concept of name-day, in this embodiment occurring on Mar. 12, 2001, a Monday. Victoria is the name of the day which is comprised in the package 28 and indicated as 30 in FIG. 2. An announcer, newscaster or the like presents the name Victoria and announces the official flag-flying day 34, at least if the program or package 28 is broadcasted in the morning. The newscaster tells the origin of the name, how many bearers the name Victoria has, for example in the US, and in which state of the US most of them are citizens. Further, an interview 32, old or new, is provided with a celebrity bearer of the name Victoria, for example, the Crown Princess Victoria of Sweden.

Through the recording booth 26, ordinary people of the public are able to, for example, record a greeting to a dear friend 36 or relative, which is then transmitted to the television station 22, and broadcasted in the media program package 28.

In one embodiment, a newscaster or storyteller 38 shows trailers or vignettes of history related to the name Victoria. History could cover almost everything from births to wars, and the daily life in some ancient or close year. The media channel 40 for broadcasting of a package 28 is schematically drafted as flash arrows 40 in FIG. 2.

For countries that do not have an official name-day list, the US, this could be created by authorities, such as American Name Society (ANS), or under private supervision. Many different versions are possible, for example, different ethnic versions. It is also possible to chose a name every day in random through a random generator being provided given names from a suitable name database.

As a matter of fact, the content of a media package 28 is only restricted by the imagination of a producer of the same. The system 20 used for broadcasting of a media package 28 comprises establishing means for a name list of a predetermined period of days or on a day by day basis including at least one name for every day of said period. This establishing means could be a software program, being provided names from a name database. A media channel means for broadcasting a name of the day media package 28 comprising at least a presentation of the name(s) corresponding to the day of a broadcast 40 is provided.

The system 20 of the present invention also comprises presenting means for the package 28 on a display means 24, whereby an audience is provided tangible education about a presented name or related history in the package 28. This presenting means can be software and/or software governed, with voice recordings, a videotape, sound tape, a CD, a DVD and other known devices for presentation of media. A number of media channels 40 and presenting means 24 could be used in different embodiments of the present invention.

Further the present invention comprises a signal carrying a media package for presenting a name of the day. Thus it comprises:

a media channel signal means 40 for broadcasting a name of the day media package 28 comprising at least a presentation of the name(s) corresponding to the day of a broadcast; and whereby the signal is controlling a presentation means for the package 28 on a display means 24, whereby an audience is educated about a presented name and its history in the package. Such a media signal could be an analogous or digital signal used for broadcasting in a suitable network such as television, radio, Internet etc.

The present invention is not restricted to examples and embodiments provided in this description. Other embodiments are possible for a person skilled in the art under consideration of the attached set of claims.

What is claimed is:

1. A system for presenting a name of the day, comprising:
    establishing means for establishing a name list of a predetermined period of days or on a day by day basis including at least one name of a human being for every day of said period;
    a media channel means for broadcasting a name of a day media package comprising at least a presentation of said at least one name, wherein the media package and the at least one name correspond to the day of a broadcast; and
    presenting means for presenting said package on a display means, whereby an audience is educated about an origin of each name presented in said package.

2. A system according to claim 1, wherein every day on said list has at least one female name of the day and one male name of the day.

3. A system according to claim 2, wherein said media channel means is a television channel.

4. A system according to claim 1, wherein said media channel means is a network for data and telecommunication.

5. A system according to claim 2, wherein said display means is a print publication.

6. A system according to claim 1, wherein said media channel means is a television channel.

7. A system according to claim 1, wherein said media channel means is a network for data and telecommunication.

8. A system according to claim 1, wherein said display means is a print publication.

9. A system according to claim 1, wherein a presentation of a celebrity bearer of a presented name is introduced through said package.

10. A system according to claim 1, wherein the name of the day is chosen by random from a database with given names.

11. The system of claim 1, wherein the at least one name comprises only one name.

12. A system for presenting a name of the day, comprising:
    establishing means for establishing a name list of a predetermined period of days or on a day by day basis including at least one name for every day of said period;
    a media channel means for broadcasting a name of a day media package comprising at least a presentation of said at least one name corresponding to the day of a broadcast;
    presenting means for presenting said package on a display means, whereby an audience is educated about an origin of each name presented in said package; and
    means connected to said media channel means for permitting people to greet a bearer of a presented name.

13. A system according to claim 10, wherein said means connected to said media channel means is a recording booth placed in a public place, whereby said people can record and transfer a greeting to a person bearing a presented name through said media channel means.

14. A method for presenting a name of the day, comprising the steps of:
    establishing a name list for a predetermined period of days or on a day by day basis including at least one name of a human being for every day of said period;
    using a media channel for broadcasting a name of a day media package comprising at least a presentation of said at least one name, wherein the media package and the at least one name correspond to the day of a broadcast; and
    presenting said package on display means and educating an audience about an origin of each name presented in said media package.

15. A method according to claim 14, wherein every day has at least one female name of the day and one male name of the day.

16. A method according to claim 15, wherein said media channel is a television channel.

17. A method according to claim 15, wherein said media channel is a network for data and telecommunication.

18. A method according to claim 15, wherein said display means is a print publication.

19. A method according to claim 14, wherein said media channel is a television channel.

20. A method according to claim 14, wherein said media channel is a network for data and telecommunication.

21. A method according to claim 14, wherein said display means is a print publication.

22. A method according to claim 14, wherein a presentation of a celebrity bearer of a presented name is introduced through said package.

23. A method for presenting a name of the day, comprising the steps of:
    establishing a name list for a predetermined period of days or on a day by day basis including at least one name for every day of said period;
    using a media channel means for broadcasting a name of a day media package comprising at least a presentation of said at least one name corresponding to the day of a broadcast;
    presenting said package on a display means and educating an audience about an origin of each name presented in said media package; and
    having people greet a bearer of a presented name through means connected to said media channel means.

24. A method according to claim 23, wherein said means connected to said media channel means is a recording booth placed in a public place, whereby said ordinary people can record and transfer a greeting to a person bearing a presented name through said media channel means.

25. A method according to claim 14, wherein the name of the day is chosen by random from a database with given names.

26. In combination, a signal and a system including a presentation means and a display means for presenting a name of the day media package, said signal comprising:
    a media channel signal means for broadcasting a name of a day media package comprising at least a presentation of at least one name of a human being, wherein the media package and the at least one name correspond to the day of a broadcast, wherein
    said signal controls said presentation means for said media package on said display means, whereby an audience is educated about an origin of each name presented in said package.

27. The combination according to claim 26, wherein said signal is stored on a videocassette.

28. The combination according to claim 26, wherein said signal is stored on a CD or a DVD.

29. The combination according to claim 26, wherein said signal is transmitted on a network for data- and telecommunication.

30. The combination according to claim 26, wherein said signal is stored on an audio cassette.

31. The combination according to claim 26, wherein said signal is transmitted from a television or radio station.

* * * * *

UNITED STATES PATENT AND TRADEMARK OFFICE
CERTIFICATE OF CORRECTION

PATENT NO. : 6,712,616 B2
DATED : March 30, 2004
INVENTOR(S) : Björn Albrektson

It is certified that error appears in the above-identified patent and that said Letters Patent is hereby corrected as shown below:

Column 5,
Line 28, "10" should be -- 12 --.

Signed and Sealed this

Twenty-ninth Day of June, 2004

JON W. DUDAS
*Acting Director of the United States Patent and Trademark Office*